Patented May 5, 1953

2,637,735

UNITED STATES PATENT OFFICE 2,637,735

PROCESS FOR THE PREPARATION OF STEROID-17-CARBOXYLIC ACIDS

Albert Wettstein and Charles Meystre, Basel, Switzerland, assignors to Ciba Pharmaceutical Products, Inc., Summit, N. J.

No Drawing. Application May 7, 1948, Serial No. 25,796. In Switzerland May 14, 1947

14 Claims. (Cl. 260—397.1)

The present invention relates to the preparation of steroid-17-carboxylic acids. More particularly, the invention has especial relation to improvements in the oxidative degradation of the side chain in $\Delta^{20,23}$-21-hydroxy-choladienes to form aetio acids.

A primary object of the invention is the embodiment of a process which makes it possible to prepare the steroid-17-carboxylic acids in advantageous manner.

A further object of the invention is to develop an improved process for the conversion of the bile acids into the aetio acids.

Still another object of the invention is the development of a new side chain degradation whereby it is possible directly to eliminate at least 4 carbon atoms of the side chain of the aforesaid type of compounds by means of a controllable oxidative degradation reaction and with good yield.

The foregoing and other objects of the invention, which will be manifest to the expert in the art from the following description, is realized by subjecting the $\Delta^{20,23}$-21-hydroxy-choladienes to oxidative degradation in the manner hereinafter set forth.

The $\Delta^{20,23}$ - 21 - hydroxy - choladienes used as starting materials may be obtained, for example, by the treatment of $\Delta^{20,23}$-21-halogen-choladienes with agents which replace an aliphatically bound halogen atom by a free hydroxyl group. The $\Delta^{20,23}$-21-halogen-choladienes themselves can be prepared in simple manner according to copending application, S. N. 741,954, filed April 16, 1947 (now U. S. Patent No. 2,599,007), and may be of any desired configuration.

The said application discloses inter alia the preparation of 21-halogenated $\Delta^{20,23}$-24,24-diphenyl-choladienes by the treatment of the corresponding unhalogenated compound with a carboxylic acid imide, amide or aryl-amide, e. g. N-bromo-succinimide, in the presence of light. The $\Delta^{20,23}$-21-halogen-choladienes contain conjugated carbon-to-carbon double bonds in the side chain and may also be saturated or unsaturated, containing a double bond in, for example, the 4, 5, 7, 9, 11, 14, and/or 16-positions. In addition to the halogen atom in 21-position, they may contain any desired further substituents, particularly hydroxyl-, acyloxy-, alkoxy-, aryloxy- and/or ketogroups, for example in 3, 7, 11 and/or 12-position; halogen atoms, for example in 4, 5 or 6-position; as well as aryl- or alkyl-groups, for example in 24-position.

The said preparation of the $\Delta^{20,23}$-21-hydroxy-choladienes may take place in various ways:

For example, the $\Delta^{20,23}$-21-halogen-choladienes may be directly converted into 21-hydroxy compounds with hydrolyzing agents, for example with aqueous solvents, especially mixtures of water with indifferent organic solvents, such as diluted acetone or diluted dioxane. Instead of this, the 21-halogen compounds may also first be converted into esterified 21-hydroxy compounds with re-esterifying agentes, for example with carboxylic acid or sulfonic acid salts, such as salts of acetic, propionic or benzoic acid, or methane sulfonic acid or toluene sulfonic acid salts, or into etherified 21-hydroxy compounds with etherifying agents, for example with alcohols or phenols, such as methanol, ethanol, benzyl alcohol, tetra-acyl glucose or hepta-acyl lactose, or with corresponding alcoholates or phenolates. The 21-esters or -ethers are then converted into free 21-hydroxy compounds with hydrolyzing agents, such as alkaline or acid reagents.

These conversions generally proceed smoothly at room temperature or with warming, due to the great reactivity of the 21-substituent. When the 21-halides are treated with aqueous solvents or with alcohols or phenols, removal of the formed hydrogen halide may be effected by the addition of acid-binding agents, for example solutions or suspensions of metal carbonates or hydroxides, such as alkaline earth, alkali- or silver-carbonates or -hydroxides. The treatment with re-esterifying agents takes place in suspension or in solution, using for example the corresponding carboxylic acids or in some cases acid anhydrides, in organic, aqueous-organic or inert solvents or diluents. Similarly, the alcoholates or phenolates may also be allowed to react in solution, especially of the corresponding alcohol, or in suspension, for example in an inert solvent.

It has been found that, in such preparation, in addition to the $\Delta^{20,23}$-21-hydroxy-choladienes and their esters, isomeric compounds are apparently also formed which, upon treatment for instance with isomerizing agents, such as heating with aqueous acetic acid, can be reconverted into $\Delta^{20,23}$-21-hydroxy-choladiene and its esters. The formation of the isomeric compounds can also be appreciably suppressed by suitable choice of diluent, for example by treating the 21-halogen-choladiene with potassium acetate in acetone.

In the named starting materials, according to the process of the invention, the diene side chain of the 21-hydroxy compounds is degraded by means of oxidizing agents to form the aetio acid. Reference is here made particularly, for example, to oxidation by means of a compound of hexavalent chromium such as chromic acid, as well as with permanganate, or also by ozonization and oxidative splitting of the ozonide, the action of peroxides such as perbenzoic acid, monoperphthalic acid or hydrogen peroxide, advantageously in presence of osmium tetroxide, and the splitting, for example by means of chromic acid or permanganate, of the glycols formed by the hydrolysis of the oxide ring or by direct addition of hydroxyl groups to the double bonds.

During this oxidation, double bonds contained in the cyclopentanopolyhydrophenanthrene nucleus are preferably protected, for example by means of halogen or hydrogen halide, in case such protection is not rendered superfluous by the special properties of the unsaturated system as for instance in the case of a double bond with α-positioned keto group or a double bond in 11,12-position. In addition, oxidizable substituents, for example nuclear hydroxyl groups may be protected per se in conventional manner for instance by esterification or etherification and, after the oxidation, partially or, if desired, totally again set free, for example by the action of hydrolyzing agents. In the event, however, that a conversion of free ring carbinol groups into keto groups is desired, such conversion may be carried out in per se known manner simultaneously with the oxidative degradation of the side chain or in a separate reaction, particularly by the action of oxidizing or dehydrogenating agents. Here also use may be made, as oxidizing agents, of for example chromic acid, permanganate, etc., while as dehydrogenating agents use may be made especially of metal alcoholates or phenolates and carbonyl compounds (exchange of oxidation stages) or for example powdered metal with the action of heat and vacuum. It may also be desirable during the oxidation of ring carbinol groups to protect in the described manner carbon double bonds which may be present.

Moreover, it is also possible, before or after the oxidation, to liberate all or only a part of the existing esterified or etherified hydroxyl groups or to split them off with formation of a carbon double bond. This is accomplished, for example for acylated and etherified hydroxyl groups by the action of hydrolyzing agents such as alkaline or acid reagents, or thermally; for hydrohalic acid esters by the action of alkaline agents, carboxylic acid salts or tertiary amines; or for sulfonic acid esters by means of tertiary amines or thermally.

Finally, it is possible, again before or after the oxidation, to react free nuclear hydroxyl groups with esterifying or etherifying agents. Thus it is possible for example in per se known manner to prepare acyl derivatives, such as acetates, propionates, benzoates or anthraquinone carboxylic acid esters, sulfonic acid esters, such as methane sulfonates or tosylates, carbonic acid esters such as alkyl carbonates or ethers, such as methyl-, ethyl- or trityl-ethers, glucosides and the like.

The products of the process may be conventionally separated and purified, for example by recrystallization, conversion into their esters and chromatography, sublimation, partial saponification, conversion into their salts and utilization of their differential solubility or, in so far as they contain keto groups, by reaction with ketone reagents. The products of the process, saturated and unsaturated acids of the type of aetio-cholanic acid, are valuable intermediates for the preparation of medicinal products especially of the corpus luteum hormone and the suprarenal cortical hormone.

The invention is described in greater detail in the following examples, wherein the relationship between parts by weight and parts by volume is the same as between gram and cubic centimeters.

*Example 1*

In order to prepare the starting material $\Delta^{20,23}$-3,12-diacetoxy-21-hydroxy-24,24-diphenyl-choladiene, 3 parts by weight of $\Delta^{20,23}$-3,12-diacetoxy-21-bromo-24,24-diphenyl-choladiene, obtainable by the action of N-bromosuccinimide on $\Delta^{20,23}$-3,12-diacetoxy-24,24-diphenyl-choladiene in carbon tetrachloride with exposure to light, are heated on the water bath for 2 hours with 10 parts by volume of water, 90 parts by volume of acetone and 3 parts by weight of calcium carbonate. The solution is freed of acetone in vacuo, the obtained aqueous suspension shaken out with ether, the ethereal solution washed with dilute hydrochloric acid and water, dried and evaporated. The $\Delta^{20,23}$-3,12-diacetoxy-21-hydroxy-24,24-diphenyl-choladiene crystallizes from methanol as wool-like needles, which melt at 123–125° C., solidify again, and finally melt at 167–169° C.

2 parts by weight of this compound are dissolved cold in 50 parts by volume of 90% acetic acid and are treated at 15° C. with a solution of 1.5 parts by weight of chromium trioxide in 20 parts by volume of 90% acetic acid. After standing for 15 hours, it is cooled, the unconsumed chromic acid carefully decomposed with a little sodium bisulfite solution and the reaction solution concentrated in vacuo with several additions of water. The aqueous suspension is extracted with an ether-chloroform mixture (4:1), the extract washed with water, and the acids then extracted from the ether-chloroform solution with dilute sodium carbonate solution. The sodium carbonate solutions are acidified with hydrochloric acid and extracted with ether. The ethereal solution is washed with water, dried and evaporated. The known 3,12-diacetoxy-aetio-cholanic acid crystallizes from ether-pentane mixture. It melts at 196–198° C. For purification, it is preferably methylated in ether by means of aqueous diazomethane solution and the obtained 3,12-diacetoxy-aetio-cholanic acid-methyl ester is recrystallized from aqueous methanol. It then melts at 149–150° C.

*Example 2*

8 parts by weight of $\Delta^{20,23}$-3,12,21-trihydroxy-24,24-diphenyl-choladiene are dissolved in 100 parts by volume of 90% acetic acid, the solution admixed with a solution of 5 parts by weight of chromium trioxide in 50 parts by volume of 90% acetic acid, and the mixture allowed to stand for 8 hours at 15° C. Unconsumed chromic acid is then carefully decomposed with sodium bisulfite solution while cooling, the solution then concentrated in vacuo with repeated addition of water, and the remaining aqueous suspension extracted with an ether-chloroform mixture (4:1). The ether-chloroform solution is washed with water and extracted with dilute sodium carbonate solution. The sodium carbonate solutions are acidified with hydrochloric acid and extracted with ether. The ethereal solution is then washed with water, dried and concentrated. The known 3,12-diketo-aetio-cholanic acid crystallizes gradually from the residue. After recrystallizing from ether, it melts at 176–177° C. Upon treatment with diazomethane in a benzene-ether mixture, there is obtained the 3,12-diketo-aetio-cholanic acid-methyl ester which, recrystallized from acetone-ether, melts at 169–171° C.

The $\Delta^{20,23}$-3,12,21-trihydroxy-24,24 - diphenyl-choladiene, used as starting material in this example may be prepared for example as follows:

10 parts by weight of $\Delta^{20,23}$-3,12-diacetoxy-21-bromo-24,24-diphenyl-choladiene and 10 parts by weight of anhydrous potassium acetate are heated with 100 parts by volume of glacial acetic acid in a boiling water bath for two hours under a calcium chloride seal. The clear solution is then evaporated in vacuo, water added to the residue and the product extracted with ether. The ethereal solution is washed with water, dried and evaporated. The residue is recrystallized from acetone-methanol and there is thus obtained the $\Delta^{20,23}$ - 3,12,21 - triacetoxy - 24,24 - diphenyl-choladiene with a melting point of 175–177° C. The mother liquors, which crystallize no more, are then evaporated, heated on the water bath for one hour in 50 parts by volume of 80% acetic acid, and worked up as above. A further quantity of $\Delta^{20,23}$-3,12,21-triacetoxy-24,-24-diphenyl-choladiene crystallizes from a mixture of a little acetone and methanol. The mother liquors of the last product, which crystallize no more, are then treated as above with 80% acetic acid until nothing more crystallizes out upon treatment and working up.

The same compound is also obtained when for example 10 parts by weight of $\Delta^{20,23}$-3,12-diacetoxy-21-bromo-24,24 - diphenyl - choladiene and 20 parts by weight of anhydrous potassium acetate in 200 parts by volume of acetone are boiled for 6 hours under a reflux condenser, with a calcium chloride seal. Working up is then carried out exactly as in the conversion in glacial acetic acid.

10 parts by weight of $\Delta^{20,23}$-3,12,21-triacetoxy-24,24-diphenyl-choladiene are taken up in 90 parts by volume of methanol and 10 parts by volume of benzene, admixed with 3 parts by weight of potassium hydroxide and a little water, and heated for one hour under reflux on the water bath. The reaction solution is evaporated in vacuo after addition of a little water, the aqueous suspension shaken out with ether, the ethereal solution washed with water, dried, evaporated and the $\Delta^{20,23}$-3,12,21-trihydrovy-24,-24-diphenyl-choladiene obtained as residue.

*Example 3*

10 parts by weight of $\Delta^{20,23}$-3-keto-12-acetoxy-21-bromo-24,24-diphenyl-choladiene, obtainable by the action of N-bromo-succinimide on $\Delta^{20,23}$-3-keto-12-acetoxy - 24,24 - diphenyl - choladiene in carbon tetrachloride with exposure to light, are heated on the water bath for two hours under a reflux condenser with 180 parts by volume of acetone and 20 parts by volume of water with addition of 3 parts by weight of calcium carbonate. The suspension is concentrated in vacuo, extracted with ether, the ethereal solution washed with dilute hydrochloric acid and water, dried and evaporated.

The obtained $\Delta^{20,23}$-3-keto-12-acetoxy - 21-hydroxy-24,24-diphenyl-choladiene is dissolved at 0° C. in 50 parts by volume of ethylene chloride and 100 parts by volume of 90% acetic acid, admixed with 4.2 parts by weight of chromium trioxide, and allowed to stand for 20 hours at 0° C. The excess of chromic acid is decomposed carefully with a little sodium bisulfite solution; and the reaction solution concentrated in vacuo with repeated addition of water. The aqueous suspension is extracted with an ether-chloroform mixture (4:1), the ether-chloroform solution washed with water and extracted with dilute sodium carbonate solution. The sodium carbonate solutions are acidified with sulfuric acid and extracted with ether, the ethereal solutions washed with water, dried and evaporated. The thus obtained 3-keto-12-acetoxy-aetio-cholanic acid is preferably converted into its methyl ester with diazo-methane and the said ester recrystallized form ether-petroleum ether. The 3-keto-12-acetoxy-aetio-cholanic acid-methyl ester melts at 95–96° C.

*Example 4*

The preparation of the starting material used in this example may be carried out for example as follows: $\Delta^{4,20,23}$-3-keto-21 - bromo - 24,24 - diphenyl-cholatriene, obtained by the action of N-bromo-succinimide on 10 parts by weight of $\Delta^{4,20,23}$-3-keto-24,24-diphenyl-cholatriene in carbon tetrachloride with exposure to light, is heated on the water bath for 6 hours with 20 parts by weight of dry potassium acetate in 100 parts by volume of acetone. Then the suspension is evaporated in vacuo, water added to the residue which is then extracted with ether. The ethereal solution is washed with water, dried and evaporated.

5 parts by weight of this $\Delta^{4,20,23}$-3-keto-21-acetoxy-24,24-diphenyl-cholatriene are dissolved in 10 parts by volume of methanol and 10 parts by volume of benzene, admixed with a solution of 2 parts by weight of potassium carbonate in a small quantity of water and heated on the water bath under reflux for 1 hour. The solution is then concentrated in vacuo after the addition of water, the obtained aqueous suspension is extracted with ether, the ethereal solution washed with water, dried and evaporated. There is thus obtained the $\Delta^{4,20,23}$-3-keto-21-hydroxy- 24,24-diphenyl-cholatriene. This same compound can also be obtained directly from $\Delta^{4,20,23}$-3-keto-21-bromo-24,24-diphenyl-cholatriene in the following manner: 10 parts thereof are dissolved in 180 parts by volume of acetone (or dioxane) and 20 parts by volume of water, 10 parts by weight of calcium carbonate are added and the whole is heated for 2 hours on the water bath under reflux. Then it is evaporated in vacuo after addition of water, extracted with ether, the ethereal solution washed with hydrochloric acid and water, dried and evaporated, whereby the same $\Delta^{4,20,23}$-3-keto-21-hydroxy-24,24-diphenyl-cholatriene is obtained.

The 21-hydroxy compound thus obtained in the one or the other way is then dissolved in 50 parts by volume of ethylene chloride and 50 parts by volume of 90% acetic acid, admixed at —5° C. with a solution of 3 parts by weight of chromium trioxide in 50 parts by volume of 90% acetic acid and allowed to stand at 0° C. for 20 hours. The excess of chromic acid is carefully decomposed with some sodium bisulfite solution while cooling and the solution is concentrated in vacuo with repeated addition of water. The aqueous suspension is extracted with an ether-chloroform mixture (4:1) and the ether-chloroform solution washed with water. The acids are then extracted with dilute sodium carbonate solution. The sodium carbonate solutions, acidified with hydrochloric acid, are extracted with ether, the ethereal solutions washed with water, dried and evaporated. The $\Delta^4$-3-keto-aetio-cholanic acid melts after recrystallization from a small quantity of acetone and ether, at 237-240° C. Methylation with diazomethane yields its methyl ester which, recrystallized from methanol, melts at 129-131° C.

*Example 5*

10 parts by weight of $\Delta^{20,23}$-3-acetoxy-5-chloro-21-bromo-24,24-diphenyl-choladiene, obtainable by the action of N-bromo-succinimide on $\Delta^{20,23}$-3-acetoxy-5-chloro-24,24-diphenyl-choladiene in carbon tetrachloride with exposure to light, are dissolved in 300 parts by volume of acetone, 30 parts by volume of water and 10 parts by weight of calcium carbonate are added, and the mixture heated for 1 hour on the water-bath. The suspension is diluted with water, concentrated in vacuo and extracted with ether. The ethereal solution is washed with dilute hydrochloric acid and water, dried and evaporated.

The thus-obtained $\Delta^{20,23}$-3-acetoxy-5-chloro-21-hydroxy-24,24-diphenyl-choladiene is dissolved in 50 parts by volume of ethylene chloride and 100 parts by volume of acetic acid and is oxidized for 20 hours at 0° C. with a solution of 5 parts by weight of chromium trioxide in 10 parts by volume of water. The oxidation mixture is worked up as described in the preceding examples. The obtained 3-acetoxy-5-chloro-aetio-cholanic acid is boiled for 1 hour under reflux on a water-bath with a solution of 3.5 parts by weight of potassium hydroxide in 100 parts by volume of ethanol. Water is then added to the solution which is then concentrated in vacuo, acidified with hydrochloric acid, the precipitate suction-filtered, washed with water and a little acetone and recrystallized from dioxane. The obtained $\Delta^5$-3-hydroxy-aetio-cholanic acid melts at 280° C. By treatment with diazomethane, it can be readily converted into its methyl ester. This crystallizes from methanol as needles melting at 178-180° C.

*Example 6*

3 parts by weight of $\Delta^{20,23}$-3,11-diketo-21-bromo-24,24-diphenyl-choladiene, obtainable by the action of N-bromo-succinimide on $\Delta^{20,23}$-3,11-diketo-24,24-diphenyl-choladiene in carbon tetrachloride with exposure to light are dissolved in 50 parts by volume of acetone-water mixture (9:1) and heated on the water-bath under reflux for 1½ hours with 2.5 parts by weight of calcium carbonate. A small quantity of water is added to the suspension, which is then concentrated in vacuo, extracted with an ether-chloroform mixture (4:1), the ether-chloroform solution washed with dilute hydrochloric acid and water, dried and evaporated.

The residue, $\Delta^{20,23}$-3,11-diketo-21-hydroxy-24,24-diphenyl-choladiene, is dissolved in 25 parts by volume of ethylene chloride and 50 parts by volume of acetic acid, mixed at —5° C. with a solution of 1.7 parts by weight of chromium trioxide in 5 parts by volume of water and allowed to stand 15 hours at 0° C. The oxidation mixed is worked up as in the preceding examples. The obtained 3,11-diketo-aetio-cholanic acid is allowed to stand 10 minutes with an excess of ethereal diazomethane solution. It is then washed with dilute hydrochloric acid, water, dilute sodium carbonate solution and water, dried and concentrated. Upon standing 3,11-diketo-aetio-cholanic acid-methyl ester crystallizes out. It melts at 185° C.

*Example 7*

10 parts by weight of $\Delta^{20,23}$-3-acetoxy-24,24-diphenyl-allo-choladiene are converted with N-bromo-succinimide in carbon tetrachloride with exposure to light into $\Delta^{20,23}$-3-acetoxy-21-bromo-24,24-diphenyl-allo-choladiene, the last-named compound is boiled for 2 hours under reflux on the waterbath in 100 parts by volume of acetone-water mixture (9:1) with 10 parts by weight of calcium carbonate. The obtained suspension is worked up as described in the preceding examples, and $\Delta^{20,23}$-4-acetoxy-21-hydroxy-24,24-diphenyl-allo-choladiene is obtained.

It is then dissolved in 50 parts by volume of ethylene chloride and 100 parts by volume of acetic acid, admixed at —5° C. with a solution of 6.1 parts by weight of chromium trioxide in 10 parts by volume of water and allowed to stand for 20 hours at 0° C. The oxidation mixture is worked up as in the preceding examples. The 3-acetoxy-aetio-allo-cholanic acid crystallizes upon wetting with ether and melts at 245-247° C. It is admixed with an excess of ethereal diazomethane solution, the resulting solution washed after 10 minutes with dilute hydrochloric acid, water, dilute sodium carbonate solution and water, dried and evaporated. The 3-acetoxy-aetio-allo-cholanic acid-methyl ester crystallizes from methanol and melts at 143-144° C.

Having thus described the invention, what is claimed is:

1. A process for the preparation of a steroid-17-carboxylic acid, which comprises splitting the conjugated double bond in a $\Delta^{20,23}$-21-hydroxy choladiene by subjecting the said choladiene to the action of an oxidizing agent, whereby the aetio acid is formed.

2. A process for the preparation of a steroid-17-carboxylic acid, which comprises splitting the conjugated double bond in a $\Delta^{20,23}$-21-hydroxy-24,24-diphenyl-choladiene by subjecting the said choladiene to the action of an oxidizing agent, whereby the aetio acid is formed.

3. A process for the preparation of a steroid-17-carboxylic acid, which comprises splitting the conjugated double bond in a $\Delta^{20,23}$-21-hydroxy-24,24-diphenyl-choladiene which contains in the 3-position a member selected from the class consisting of

and

and in one of the positions 11 and 12 a member selected from the class consisting of

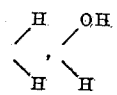

and

the acyl group being in each case lower aliphatic acyl, by subjecting the said choladiene to the action of an oxidizing agent, whereby the aetio acid is formed.

4. A process for the preparation of a steroid-17-carboxylic acid, which comprises splitting the conjugated double bond in a $\Delta^{20,23}$-21-hydroxy- 24,24-diphenyl-choladiene which contains in at least one of the two positions 4:5 and 11:12, and 5:6 and 11:12, respectively, a carbon-to-carbon double bond, by subjecting the said choladiene to the action of an oxidizing agent, whereby the aetio acid is formed.

5. A process for the preparation of a steroid-17-carboxylic acid, which comprises splitting the conjugated double bond in a $\Delta^{20,23}$-3-acetoxy-21-hydroxy-24,24-diphenyl-choladiene, by subjecting the said choladiene to the action of an oxidizing agent, whereby the aetio acid is formed.

6. A process for the preparation of a steroid-17-carboxylic acid, which comprises splitting the conjugated double bond in a $\Delta^{20,23}$-3,12-diacetoxy-21-hydroxy-24,24-diphenyl-choladiene, by subjecting the said choladiene to the action of an oxidizing agent, whereby the aetio acid is formed.

7. A process for the preparation of a steroid-17-carboxylic acid, which comprises splitting the conjugated double bond in a $\Delta^{20,23}$-3,11-diketo-21,hydroxy-24,24-diphenyl-choladiene by subjecting the said choladiene to the action of an oxidizing agent, whereby the aetio acid is formed.

8. A process for the preparation of a steriod-17-carboxylic acid, which comprises splitting the conjugated double bond in a $\Delta^{20,23}$-21-hydroxy-choladiene by subjecting the said choladiene to the action of chromium trioxide in acetic acid medium, whereby the carbon atom in 21-position is eliminated and the aetio acid is formed.

9. A process for the preparation of a steroid-17-carboxylic acid, which comprises splitting the conjugated double bond in a $\Delta^{20,23}$-21-hydroxy-24,24-diphenyl-choladiene by subjecting the said choladiene to the action of chromium trioxide in acetic acid medium, whereby the carbon atom in 21-position is eliminated and the aetio acid is formed.

10. A process for the preparation of a steroid-17-carboxylic acid, which comprises splitting the conjugated double bond in a $\Delta^{20,23}$-21-hydroxy-24,24-diphenyl-choladiene which contains in the 3-position a member selected from the class consisting of

and

and in one of the positions 11 and 12 a member selected from the class consisting of

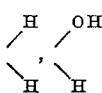

and

the acyl group being in each case lower aliphatic acyl, by subjecting the said choladiene to the action of chromium trioxide in acetic acid medium, whereby the carbon atom in 21-position is eliminated and the aetio acid is formed.

11. A process for the preparation of a steriod-17-carboxylic acid, which comprises splitting the conjugated double bond in a $\Delta^{20,23}$-21-hydroxy-24,24-diphenyl-choladiene which contains in at least one of the two positions 4:5 and 11:12, and 5:6 and 11:12, respectively, a carbon-to-carbon double bond, by subjecting the said choladiene to the action of chromium trioxide in acetic acid medium, whereby the carbon atom in 21-position is eliminated and the aetio acid is formed.

12. A process for the preparation of a steroid-17-carboxylic acid, which comprises splitting the conjugated double bond in a $\Delta^{20,23}$-3-acetoxy-21-hydroxy-24,24-diphenyl-choladiene, by subjecting the said choladiene to the action of chromium trioxide in acetic acid medium, whereby the carbon atom in 21-position is eliminated and the aetio acid is formed.

13. A process for the preparation of a steroid-17-carboxylic acid, which comprises splitting the conjugated double bond in a $\Delta^{20,23}$-3,12-diacetoxy-21-hydroxy-24,24-diphenyl-choladiene, by subjecting the said choladiene to the action of chromium trioxide in acetic acid medium, whereby the carbon atom in 21-position is eliminated and the aetio acid is formed.

14. A process for the preparation of a steroid-17-carboxylic acid, which comprises splitting the conjugated double bond in a $\Delta^{20,23}$-3,11-diketo-21-hydroxy-24,24-diphenyl-choladiene by subjecting the said choladiene to the action of chromium trioxide in acetic acid medium, whereby the carbon atom in 21-position is eliminated and the aetio acid is formed.

ALBERT WETTSTEIN.
CHARLES MEYSTRE.

References Cited in the file of this patent

UNITED STATES PATENTS

| Number | Name | Date |
|---|---|---|
| 2,461,563 | Miescher et al. | Feb. 15, 1949 |

OTHER REFERENCES

Meystre: Helvetica Chemica Acta 27, 1815–1824 (1944).

Meystre: Helvetica Chemica Acta 28, 1497–1506 (1945).